Jan. 15, 1946.　　J. McMULLEN ET AL　　2,393,117
SLACK ADJUSTER
Filed Aug. 25, 1944
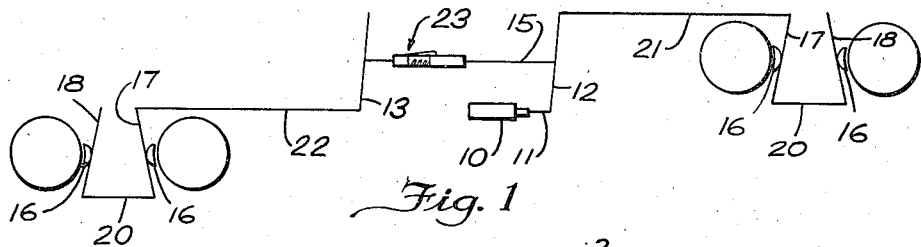
Fig. 1
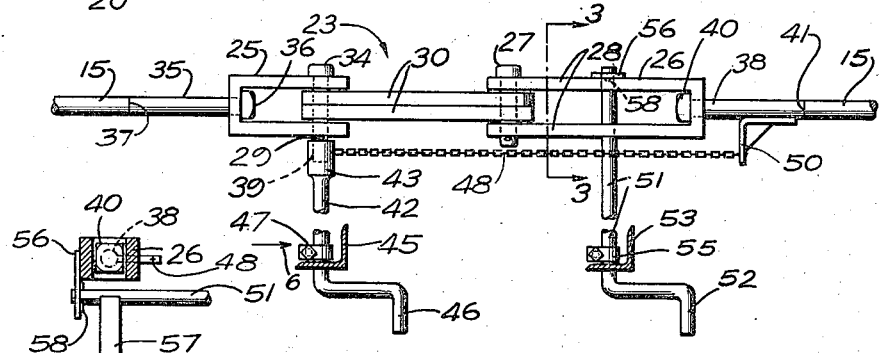
Fig. 2
Fig. 3
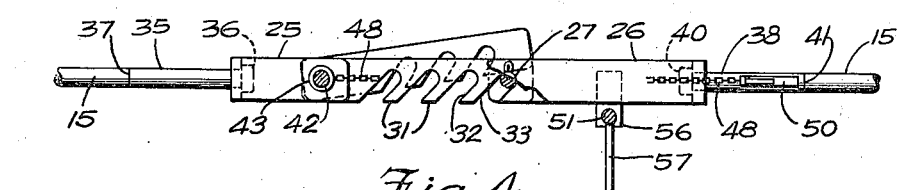
Fig. 4
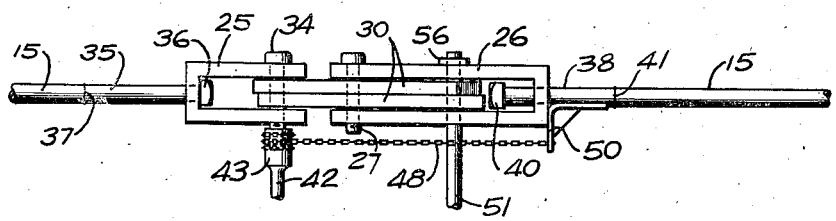
Fig. 5
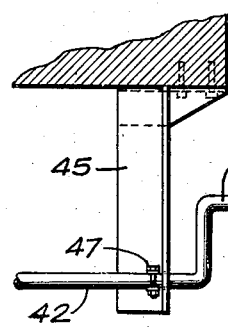
Fig. 6
Inventors:
John McMullen
John F. McMullen
Claude N. Swartwood
BY
Attys.

Patented Jan. 15, 1946

2,393,117

UNITED STATES PATENT OFFICE 2,393,117

SLACK ADJUSTER

John McMullen, Buffalo, N. Y., John F. McMullen, Cleveland Heights, Ohio, and Claude N. Swartwood, Dunmore, Pa.

Application August 25, 1944, Serial No. 551,180

11 Claims. (Cl. 188—197)

Our invention relates to brakes for railway cars and for the purpose of the present disclosure will be described as applied to the foundation brake gear of a freight car.

When a new freight car is placed in operation, the piston of the air brake cylinder has a predetermined distance of travel, usually about eight inches. As the brake shoes wear, this distance will gradually increase and may be kept within bounds only by periodically taking up the slack in the system caused by the progressive wear of the brake shoes. In making such an adjustment, however, a certain minimum slack must be retained in the brake gear to provide a normal spacing of the brake shoes from the wheels when the brakes are not in operation.

The general object of our invention is to provide means for incorporation in a foundation brake gear whereby the brake gear may be adjusted from time to time with respect to slack in compensation for brake shoe wear and may also be adjusted when new brake shoes are substituted for worn brake shoes. A further object of the invention is to design an adjustment means that will inherently provide a given minimum slackness and thereby ensure a predetermined minimum spacing from the wheels of the retracted brake shoes.

In a preferred practice of our invention, two relatively movable means serve cooperatively to carry operating stress in the foundation brake gear and one of these two means is provided with a series of teeth for releasable engagement with the other of the two means, the particular tooth engaged depending upon the particular adjustment. One problem encountered in putting such a concept into practice arises from the fact that the different stages in adjustment provided by the teeth should be close together. If the teeth are made small enough in cross section to provide the desired relatively small degrees of slack adjustment, the teeth will be so thin as to lack strength for withstanding brake operating stresses. An important object of our invention is to solve this specific problem. The solution as taught herein is found in providing a plurality of toothed engagement members arranged in staggered relation to be alternately effective. Thus, one degree of adjustment in the foundation brake gear will be represented by engagement of one engagement member in the slack adjuster and the next lower or higher degree of adjustment will be represented by engagement of another engagement member.

Other objects and advantages of our invention will be apparent in the following detailed description taken with the accompanying drawing.

In the drawing, which is to be regarded as illustrative only,

Fig. 1 is a diagrammatic view of a foundation brake gear incorporating the present invention, Fig. 2 is a plan view of the invention, Fig. 3 is a cross section taken as indicated by the line 3—3 of Fig. 2, Fig. 4 is a side elevation, partly in section, of the device shown in Fig. 1, certain rods being shown in section, Fig. 5 is a plan view similar to Fig. 1, showing the device in the course of a slack-reducing operation, and Fig. 6 is a view showing a manual means for operating the device, the view being taken as indicated by the arrow 6 in Fig. 2.

Figure 1 shows diagrammatically a foundation brake gear including an air cylinder 10 having a piston rod 11 connected to one end of a live cylinder lever 12. An intermediate point of the live cylinder lever is connected to an intermediate point of a dead cylinder lever 13 by means of a central connecting rod 15. At each end of the car, brake shoes 16 are operatively connected to intermediate points of a live truck lever 17 and a dead truck lever 18, respectively, the two truck levers being interjoined by a connecting rod 20. The live brake lever 12 is connected to the live truck lever 17 at one end of the car by a connecting rod 21 and the dead brake lever 13 is connected to the live truck lever 17 at the other end of the car by a connecting rod 22.

Our slack adjuster may be incorporated in the described foundation brake gear at various locations including the conventional location at the anchored end of the dead cylinder lever 13. In the preferred practice of our invention, however, we insert the slack adjuster in the central connecting rod 15, the connecting rod 15 being cut into two pieces or sections for adjustable interconnection by the slack adjuster. See Figure 1 in which the slack adjuster is generally designated by the numeral 23. An important advantage of so locating the slack adjuster is that less mechanical movement is required to take up a given amount of slack than at any other location in the foundation brake gearing.

Our slack adjuster 23 includes two relatively movable means cooperating to carry the operating stress that is exerted through the foundation brake gear. One of these relatively movable means may be a relatively short stirrup or U-shaped bracket member 25 and the other may be a similar stirrup or U-shaped bracket member 26 of substantially longer dimension. It is contemplated that one of the two relatively movable means 25 and 26 will provide a transverse engagement surface for releasable engagement by the other of said two relatively movable means. Thus in the construction shown in the drawing, the relatively long bracket 26 is provided with a suitable cross pin 27 interconnecting the two relatively long arms 28 of the bracket. For the purpose of releasably engaging the cross pin 27, the other of the two movable means, i. e., the shorter bracket 25 carries a plurality of suitable toothed engagement members 30.

In the preferred practice of our invention, the engagement members 30 are in the form of steel bars in each of which inclined slots are cut to form spaced inclined teeth or hook elements 31, each tooth having an inclined engagement face 32 and an inclined cam face 33. As shown in Figure 2, the engagement members 30 are pivotally mounted on a headed cross pin 34, the pin being retained in place by a cotter key 29 with a substantial end portion 39 of the pin protruding laterally from the bracket 25.

Since the cross pin 27 must be of substantial diameter and the teeth 31 must be of substantial thickness to withstand brake operating stresses, the distance from the engagement face 32 of one of the teeth 31 to the engagement face of the next successive tooth is necessarily a relatively large distance, whereas it is desirable that the device operate to take up slack in the brake gear by relatively short steps. A feature of our invention is the concept of so constructing the engagement members 30 that the teeth of one engagement member are staggered relative to the teeth of the other thereby providing for relatively short steps of slack adjustment without the necessity of reducing either the diameter of the cross pin 27 or the thickness of the teeth 31. The provision of two staggered engagement members will provide for slack adjustment steps of a magnitude corresponding to one-half the distance from the engagement face of one tooth to the engagement face of the next tooth; the provision of three such staggered engagement members will reduce the magnitude of an adjustment step to one-third of such distance, et cetera. In the present preferred arrangement, we employ two such engagement members but a larger number may be employed if shorter adjustment steps are desired. Preferably both of the engagement members 30 are yieldingly pressed downward continuously against the cross pin 27 by suitable means to facilitate engagement with the cross pin and to prevent an engagement means from rattling when not so engaged.

Each of the two relatively movable means 25 and 26 may be connected in any suitable manner to the corresponding section of the central connecting rod 15. In our preferred practice, the base portion of the bracket 25 is apertured to receive a short rod 35 having a square head 36. In installing the invention, the short rod 35 is inserted through the base of the bracket 25 with the square head 36 inside the bracket and then the rod is welded to the corresponding section of the central connecting rod 15, the welded joint being indicated at 37. In like manner, a short rod 38 having a head 40 may be passed through the apertured base of the bracket 26 and welded to the other section of the central connecting rod 15, as indicated by the welded joint 41.

Both of the short rods 35 and 38 may be fixedly connected to their respective brackets 25 and 26, for example, by spot-welding the heads 36 and 40 to the brackets 25 and 26, respectively, in which case the minimum slack required for normal brake shoe clearance at the wheels is provided by the relatively deep inclined tooth spaces. In the practice illustrated by the drawing, however, while the short rod 35 is fixedly connected to the bracket 25, the short rod 38 is slidingly mounted in the bracket 26 to provide a lost-motion connection between one end of the slack adjuster and the corresponding section of the central connecting rod 15.

Any suitable means may be employed to cause relative movement between the brackets 25 and 26 for the purpose of taking up slack in the foundation brake gear. In the present arrangement, for example, we employ a crank-operated winch so constructed that a desired relative movement between the two brackets 25 and 26 may be caused by manual operation at a point at the side of the car remote from the slack adjuster. As indicated in Figures 2 and 6, the slack-tightening means includes a transverse rod 42 enlarged and bored at its inner end to provide a winch element 43 with an end socket whereby the winch element and the end of the rod 42 may be journalled on the previously mentioned protruding end 39 of the cross pin 34.

The rod 42 is rotatably supported by a depending angle iron 45 at the side of the car, the angle iron being suitably apertured to receive the rod, and the outer end of the rod is formed into a crank 46 for manual operation. To prevent the rod 42 from being retracted out of engagement with the protruding end portion 39 of the cross pin 34, the rod may be embraced by a split collar 47 to serve as limiting means in cooperation with the depending angle iron 45. See Figures 2 and 6. One end of a chain 48 or other suitable flexible means is anchored to the winch element 43 to be wound thereon in response to rotation of the crank 46 and the other end is anchored at a suitable point to cause the desired slack reduction or contraction of the foundation brake gear.

In the construction shown in the drawing, it is desired that rotation of the crank 46 will not only cause relative movement between the two brackets 25 and 26 to contract the brake gear but also will cause the slack to be taken up in the previously mentioned lost-motion connection for additional contraction of the brake gear. For this purpose, the chain 48 is connected to the short rod 38 rather than connected to the bracket 26. As shown in Figure 2, the chain connection may be made to a suitable anchor member 50 welded to the short rod 38. The anchor member 50 has the additional function of serving as a stop to limit the extent of lost motion.

The preferred form of our invention additionally includes means to disengage the tooth engagement members 30 to permit such expansion of the foundation brake gear as may be required for the installation of new brake shoes to replace worn brake shoes. For this purpose a second transverse rod 51 is provided with the outer end of the rod formed into a crank 52. The rod is journalled in a suitable aperture in a second depending angle iron 53 and in a manner previously described is provided with a split collar 55 to cooperate with the depending angle iron as stop means to prevent retraction of the rod.

The inner end of the rod 51 is journalled in an aperture in a short metal bar 56 welded onto the bracket 26 and extending below the bracket. Fixedly mounted on the rod 51 is a radial release arm 57 positioned to swing upwardly between the two arms 28 of the bracket 26. Figure 3 shows a cotter key 58 on the rod 51 to cooperate with the short bar 56 as stop means to prevent the rod from shifting inwardly. It is apparent that the cotter key 58 and the split collar 55 ensure that the release arm 57 will at all times be in proper position for lifting the engagement members 30.

The manner in which our slack adjuster operates may be readily understood from the foregoing description. Let it be assumed that when the car is equipped with new brake shoes the brake gear must be in the relatively expanded state represented by Figures 2 and 4. It will be noted in these figures that the outermost tooth of one of the two engagement members 30 engages the cross pin 27 and that the other engagement member is at an inclined position with the cam face of its outermost tooth resting against the cross pin 27. At infrequent intervals a workman will rotate the crank 46 for the purpose of taking up slack caused by wear of brake shoes.

Rotation of the crank 46 will initially draw the anchor member 50 against the base of the bracket 26 and then cause the two brackets 25 and 26 to move towards each other. Such relative movement of the two brackets 25 and 26 causes the two engagement members 30 to rise by means of cam action against the cross pin 27. If sufficient slack is made available in the foundation brake gear by wearing away of the brake shoes, the two engagement members 30 ride over the cross pin 27 and one or more teeth of the two engagement members pass over the cross pin. Figure 5 shows the positions of the various parts when rotation of the crank 46 has taken up all of the available slack at an advanced stage in the wearing of the various brake shoes.

When the workman has taken up all the available slack, he releases the crank 46, whereupon the foundation gear expands to take up the previously mentioned lost motion and to draw the two brackets 25 and 26 apart. The relative movement of the brackets 25 and 26 away from each other immediately causes a tooth of one of the engagement members 30 to engage the cross pin 27 thereby to limit the relative movement.

In the described mode of operation it will be noted that the inclined or hook configuration of the teeth 31 of the engagement members 30 ensures a predetermined minimum expansion movement of the two brackets 25 and 26 relative to each other when the crank 46 is released and that the lost motion represented by the distance of the anchor member 50 from the end of the bracket 26 provides for further expansion in the brake gear. Thus, both the fact that the teeth of the engagement means are inclined and the fact that a lost-motion connection is provided ensure a predetermined minimum amount of slack in the foundation brake gear of whatever magnitude is necessary to ensure a predetermined minimum spacing of the brake shoes from the car wheels when the brakes are not applied. In some practices of our invention, the inclination of the teeth alone will provide the desired minimum slack, in which case it will not be necessary to provide for lost motion in addition and the short rod 38 may be fixedly connected with the bracket 26.

Whenever it is desired to replace some or all of the brake shoes, it will be necessary to expand the slack adjuster to accommodate the replacement. To cause such expansion of the slack adjuster, the operator grasps the crank 52 to swing the release arm 57 upward toward the underside of the two engagement members 30 and at the same time rotates the crank 46 to contract the slack adjuster sufficiently to release the particular engagement member that is hooked over the cross pin 27. When both of the engagement members 30 are free of the cross pin 27, the operator releases or reverses the crank 46 to permit the slack adjuster to expand, the release arm 57 meanwhile being maintained in position to hold the two engagement members 30 sufficiently elevated to preclude engagement of the cross pin 27 by any of the teeth 31. At the end of the shoe replacement operation, the workman rotates the crank 46 to limit lightness thereby to restore whatever slack should be restored in the system.

It is apparent that the various manipulations described above will involve shifting back and forth of the parts of the slack adjuster longitudinally of the car so that the inner ends of the crank-operated rods 42 and 51 shift while the outer ends are held by fixed brackets. In practice, therefore, sufficient looseness of fit of the rods in the brackets and of the connections at the inner ends of the rods is provided to permit the required freedom of movement of the slack adjuster parts.

The particular form of our invention described in detail herein for the purpose of description will suggest to those skilled in the art various changes and substitutions under our basic concepts and we reserve the right to all such departures from our description that properly lie in the scope of our appended claims.

We claim:

1. In a slack adjuster for foundation brake gear, two relatively movable means to serve cooperatively to carry operating stress in the brake gear, one of said two means having an engagement surface, the other of said two means having at least two series of sequentially positioned engagement surfaces for engagement with the engagement surface of said one of the two means, the engagement surfaces of said two series being inclined for hooking engagement with said one means whereby relative movement between the two means in the direction to contract the brake gear is required to place cooperative engagement surfaces of the two means in relative positions for initial mutual contact and after such mutual contact is established the engaging operation permits relative movement between the two means in the opposite direction with corresponding limited expansion of the brake gear, the degree of inclination and dimension along the inclination of said inclined engagement surfaces being such that said limited expansion provides the required minimum slack in the brake gear, and means to cause relative movement between said two means in a direction to contract the brake gear.

2. In a slack adjuster for foundation brake gear, two relatively movable means to serve cooperatively to carry operating stress in the brake gear, one of said two means having at least two spaced longitudinal guide portions and a transverse engagement portion, a plurality of engagement bars pivotally mounted side by side on the other of said two means for swinging movement without longitudinal movement relative to each other, said engagement bars slidably extending between said guide portions for releasable engagement with said transverse engagement portion, each of said engagement bars having a series of engagement surfaces, said series being staggered relative to each other for engagement in turn at successive relative positions of said two means, and means to cause relative movement between said two means in a direction to contract the brake gear.

3. In a slack adjuster for foundation brake gear on a car, two relatively movable means to serve cooperatively to carry operating stress in the brake gear, one of said two means having at least two spaced longitudinal guide portions and a transverse engagement portion, a plurality of engagement bars pivotally mounted on the other of said two means, said engagement bars slidably extending between said guide portions for releasable engagement with said transverse engagement portion, each of said engagement bars having a series of engagement surfaces, said series of engagement surfaces being staggered relative to each other for engagement in turn at successive relative positions of said two means, means operable at one side thereof to cause relative movement between said two means in a direction to contract the brake gear, and means operable from outside the car at one side thereof to disengage said engagement bars to permit expansion of the brake gear for the installation of new brake shoes.

4. In a slack adjuster for foundation brake gear on a car, two relatively movable means to serve cooperatively to carry operating stress in the brake gear, one of said two means having at least two spaced longitudinal guide portions and a transverse engagement portion, a plurality of longitudinal engagement members pivotally mounted on the other of said two means, said engagement members slidably extending between said guide portions for releasable engagement with said transverse engagement portion, each of said engagement members having a series of engagement surfaces, said series of engagement surfaces being staggered relative to each other for engagement in turn at successive relative positions of said two means, adjustment means to cause relative movement between said two means in a direction to contract the brake gear, means operable at one side of the car to actuate said adjustment means, means mounted on said one of said two means for disengaging said engagement members to permit expansion of the brake gear for installation of new brake shoes, and means manually operable at one side of the car to actuate the disengaging means.

5. In a slack adjuster for foundation brake gear, two relatively movable means to serve cooperatively to carry operating stress in the brake gear, said two means being incorporated in the brake gear with a lost-motion connection, a plurality of ratchet bars pivotally mounted on one of said two means for engagement with the other of the two means, the teeth of one bar being staggered with respect to the teeth of the other bar, said teeth being both inclined and relatively long for hooking engagement whereby relative movement between the two means in the direction to contract the brake gear is required to place cooperative engagement surfaces of the two means in relative positions for initial mutual contact and after such mutual contact is established the engaging operation permits relative movement between the two means in the opposite direction with corresponding limited expansion of the brake gear, and means to contract the brake gear both by taking up the lost motion in said connection and by causing relative movement between said two means in a direction to contract the brake gear whereby said lost motion combined with said limited expansion provides minimum slack in the brake gear.

6. In a slack adjuster for foundation brake gear, two relatively movable means to serve cooperatively to carry operating stress in the brake gear, one of said two means including two spaced longitudinal arms and an engagement element interconnecting the two arms, a plurality of toothed bars pivotally mounted on the other of said two means and slidingly extending between said two arms for releasably engaging said element, each of said two arms having a plurality of teeth, the series of teeth of the two arms respectively being staggered relative to each other, and means to cause relative movement between said two means in a direction to contract the brake gear, said causing means including a winch and flexible means wound on the winch.

7. In a slack adjuster for foundation brake gear, two relatively movable means to serve cooperatively to carry operating stress in the brake gear, a pivot on one of said two means, two ratchet members each having a plurality of downwardly directed ratchet teeth, said two ratchet members being pivotally mounted on said pivot for gravitational movement toward engagement with said other of the means, said two ratchet members extending side by side with the teeth of one ratchet member staggered with respect to the other, and means to cause relative movement between said two means in a direction to contract the brake gear.

8. In a slack adjuster for foundation brake gear, two relatively movable means extending in substantially the same longitudinal direction for cooperation to carry operating stress between two points in the brake gear, said two means being connected to said two points respectively, two ratchet bars pivotally mounted side by side on one of said means, said two ratchet bars having pluralities of downwardly presented teeth for engagement with the other of said two means, said pluralities of teeth being staggered relatively with respect to each other, and means operable at the side of the car to cause relative movement between said two means in a direction to contract the brake gear.

9. In a slack adjuster for foundation brake gear, two relatively movable means extending in substantially the same longitudinal direction for cooperation to carry operating stress between two points in the brake gear, said two means being connected to said two points respectively, two ratchet bars pivotally mounted side by side on one of said means, said two ratchet bars having pluralities of downwardly presented teeth for engagement with the other of said two means, said pluralities of teeth being staggered with respect to each other, take-up means mounted on one of said two means, said take-up means being connected with the other of the two means to cause relative movement between said two means in a direction to contract the brake gear, and manual means operable at the side of the car to actuate said take-up means.

10. In a slack adjuster for foundation brake gear, two relatively movable means extending in substantially the same longitudinal direction for cooperation to carry operating stress between two points in the brake gear, said two means being connected to said two points respectively, two ratchet bars pivotally mounted side by side on one of said means, said two ratchet bars having pluralities of downwardly presented teeth for engagement with the other of said two means, said pluralities of teeth being staggered with respect to each other, means operable at the side of the car to cause relative movement between said two means in a direction to contract the brake gear, and manual means operable at the side of the car to lift said two ratchet bars out of engagement to permit expansion of the brake gear for installation of new brake shoes.

11. In a slack adjuster for foundation brake gear, two relatively movable means extending in substantially the same longitudinal direction for cooperation to carry operating stress between two points in the brake gear, said two means being connected to said two points respectively, two ratchet bars pivotally mounted side by side on one of said means, said two ratchet bars having pluralities of downwardly presented teeth for engagement with the other of said two means, said pluralities of teeth being staggered with respect to each other, take-up means mounted on one of said two means, said take-up means being connected with the other of the two means to cause relative movement between said two means in a direction to contract the brake gear, manual means operable at the side of the car to actuate said take-up means, and manual means operable at the side of the car to lift said two ratchet bars out of engagement to permit expansion of the brake gear for installation of new brake shoes.

JOHN McMULLEN.
JOHN F. McMULLEN.
CLAUDE N. SWARTWOOD.